United States Patent
Park

(10) Patent No.: US 7,646,681 B2
(45) Date of Patent: Jan. 12, 2010

(54) METHOD OF AUTOMATICALLY PAUSING OPTICAL PICKUP IN DVD-RAM DISC DRIVE

(75) Inventor: Jong-nam Park, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 523 days.

(21) Appl. No.: 10/724,138

(22) Filed: Dec. 1, 2003

(65) Prior Publication Data

US 2004/0202074 A1 Oct. 14, 2004

(30) Foreign Application Priority Data

Dec. 28, 2002 (KR) .................. 10-2002-0085910

(51) Int. Cl.
*G11B 7/00* (2006.01)
(52) U.S. Cl. ............... 369/44.28; 369/47.42; 369/47.41
(58) Field of Classification Search .................. None
See application file for complete search history.

(56) References Cited

U.S. PATENT DOCUMENTS

| | | | |
|---|---|---|---|
| 5,471,448 A | | 11/1995 | Yokogawa |
| 5,793,722 A | * | 8/1998 | Yamamuro ............... 369/44.28 |
| 6,314,066 B1 | | 11/2001 | Hong et al. |
| 6,577,566 B1 | * | 6/2003 | Tomita ..................... 369/44.26 |
| 6,731,573 B2 | * | 5/2004 | Takeda ..................... 369/44.29 |
| 7,315,491 B2 | * | 1/2008 | Takaoka et al. .......... 369/44.26 |
| 2002/0054974 A1 | * | 5/2002 | Takahashi et al. .......... 428/64.4 |

FOREIGN PATENT DOCUMENTS

| | | |
|---|---|---|
| KR | 2000-0052144 | 8/2000 |
| KR | 2001-10588 | 2/2001 |
| WO | WO 02080155 A1 * | 10/2002 |

OTHER PUBLICATIONS

Korean Office Action for Application No. 10-2002-0085910.

* cited by examiner

*Primary Examiner*—Joseph H Feild
*Assistant Examiner*—Joseph Haley
(74) *Attorney, Agent, or Firm*—Staas & Halsey LLP

(57) ABSTRACT

A method of automatically pausing an optical pickup in a DVD-RAM disc drive includes driving a DVD-RAM disc; determining whether a tracking error signal is generated during the driving of the DVD-RAM disc; generating a land/groove signal to discern land tracks and groove tracks of the DVD-RAM disc; determining from which track the tracking error signal has been generated in response to the determination that the tracking error signal has been generated; generating a jump signal in response to a state of the land/groove signal varying; and moving the optical pickup back by ½ of a track in response to the jump signal.

5 Claims, 6 Drawing Sheets

METHOD OF AUTOMATICALLY PAUSING OPTICAL PICKUP IN DVD-RAM DISC DRIVE

CROSS-REFERENCE TO RELATED APPLICATIONS

This application claims the priority of Korean Patent Application No. 2002-85910, filed on Dec. 28, 2002, in the Korean Intellectual Property Office, the disclosure of which is incorporated herein in its entirety by reference.

BACKGROUND OF THE INVENTION

1. Field of the Invention

The present invention relates to a method of automatically pausing an optical pickup in a digital versatile disc (DVD)-random access memory (RAM) disc drive using a land/groove (L/G) signal to discern land tracks and groove tracks of a DVD-RAM disc on which data is recorded, so as to conveniently use the DVD-RAM disc.

2. Description of the Related Art

As is well known, optical discs or information storage media are generally classified into compact discs (CDs) and DVDs having larger storage capacity than the CDs. The optical discs are classified as read-only optical discs and writable optical discs. Examples of the read-only optical discs include ROM-type discs such as CD-read only memories (ROMs), DVD-ROMs, and so forth. The writable optical discs are classified into write-once-read-many (WORM)-type discs such as CD-Rs and DVD-Rs, CD-rewritables (RWs), and RAM-type discs such as DVD-RAMs, according to how many times writing is performed thereon.

Rewriting data to an optical disc has been conventionally adopted. For the rewriting of data, rewritable discs, such as DVD-RAMs, DVD-R/RWs, and so on, have land tracks and groove tracks to increase recording density, and data is recorded in either the land tracks or the groove tracks, or in both the land tracks and the groove tracks.

FIG. 1 shows an example of a general DVD-RAM disc 11 having land and groove tracks. Referring to FIG. 1, groove tracks 12 protrude in a direction toward an optical pickup (not shown) which radiates a laser beam onto the DVD-RAM disc 11. Land tracks 13, which alternate with the groove tracks 12, are depressed with respect to the groove tracks 12 such that a predetermined height difference d occurs between the groove tracks 12 and the land tracks 13. In addition, a track pitch TP between the groove tracks 12 and the land tracks 13 varies depending on types of discs. Generally, the track pitch TP is about 1 μm. An L/G signal is used to discern between the groove tracks 12 and the land tracks 13. The L/G signal detects the type of track on the DVD-RAM disc 11 when the DVD-RAM disc 11 is driven.

However, when an optical pickup of a disc drive playing a DVD-RAM disc with the above-described L/G structure is automatically paused, a number of times (FG) a spindle motor has rotated is counted or track identifications (IDs) are read so as to move the optical pickup back by ½ of a track. However, when data is recorded in either land tracks or groove tracks, it is not useful to move the optical pickup back during inspection of a quality of a radio frequency (RF).

SUMMARY OF THE INVENTION

The present invention provides a method of automatically pausing an optical pickup in a DVD-RAM disc drive using an L/G signal to discern land tracks and groove tracks of a DVD-RAM disc on which data is recorded, so as to conveniently use such a DVD-RAM disc.

Additional aspects and/or advantages of the invention will be set forth in part in the description which follows and, in part, will be obvious from the description, or may be learned by practice of the invention.

According to an aspect of the present invention, there is provided a method of automatically pausing an optical pickup in a DVD-RAM disc drive. The method includes: driving a DVD-RAM disc; determining whether a tracking error signal is generated during the driving of the DVD-RAM disc; generating a land/groove signal to discern land tracks and groove tracks of the DVD-RAM disc; determining from which track the tracking error signal has been generated in response to the determination that the tracking error signal has been generated; generating a jump signal in response to a state of the land/groove signal varying; and moving the optical pickup back by ½ of a track in response to the jump signal.

The land/groove signal may be at a high level when the optical pickup is positioned over the land tracks, and the land/groove signal may be at a low level when the optical pickup is positioned over the groove tracks. The land/groove signal may transit from the high level to the low level or from the low level to the high level, and the optical pickup may be positioned over either the land tracks or the groove tracks depending on the state of the land/groove signal.

The method may also include inspecting a quality of an RF of data recorded in the land tracks in response to data being recorded only in the land tracks; and inspecting a quality of an RF of data recorded in the groove tracks in response to data being recorded only in the groove tracks.

BRIEF DESCRIPTION OF THE DRAWINGS

The above and/or other features and advantages of the present invention will become more apparent by describing in detail exemplary embodiments thereof with reference to the attached drawings in which.

DETAILED DESCRIPTION OF THE PREFERRED EMBODIMENTS

Figure 1:
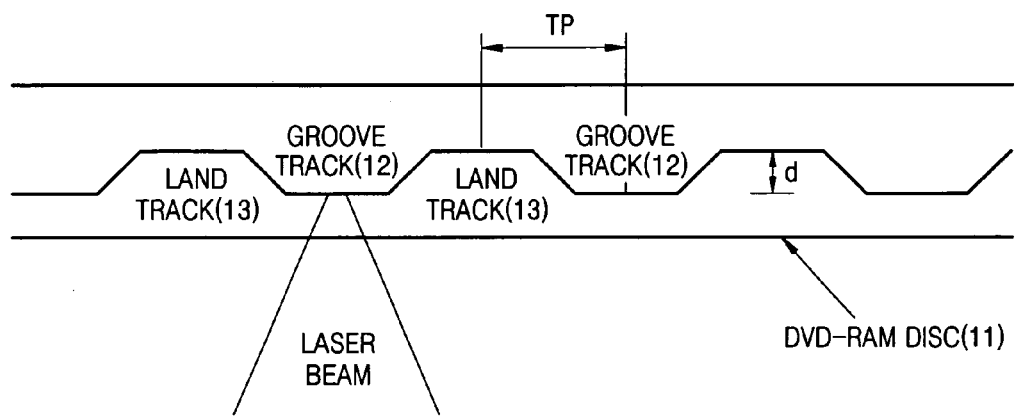
FIG. 1 is a view showing a track format of a conventional DVD-RAM disc.
Figure 2:
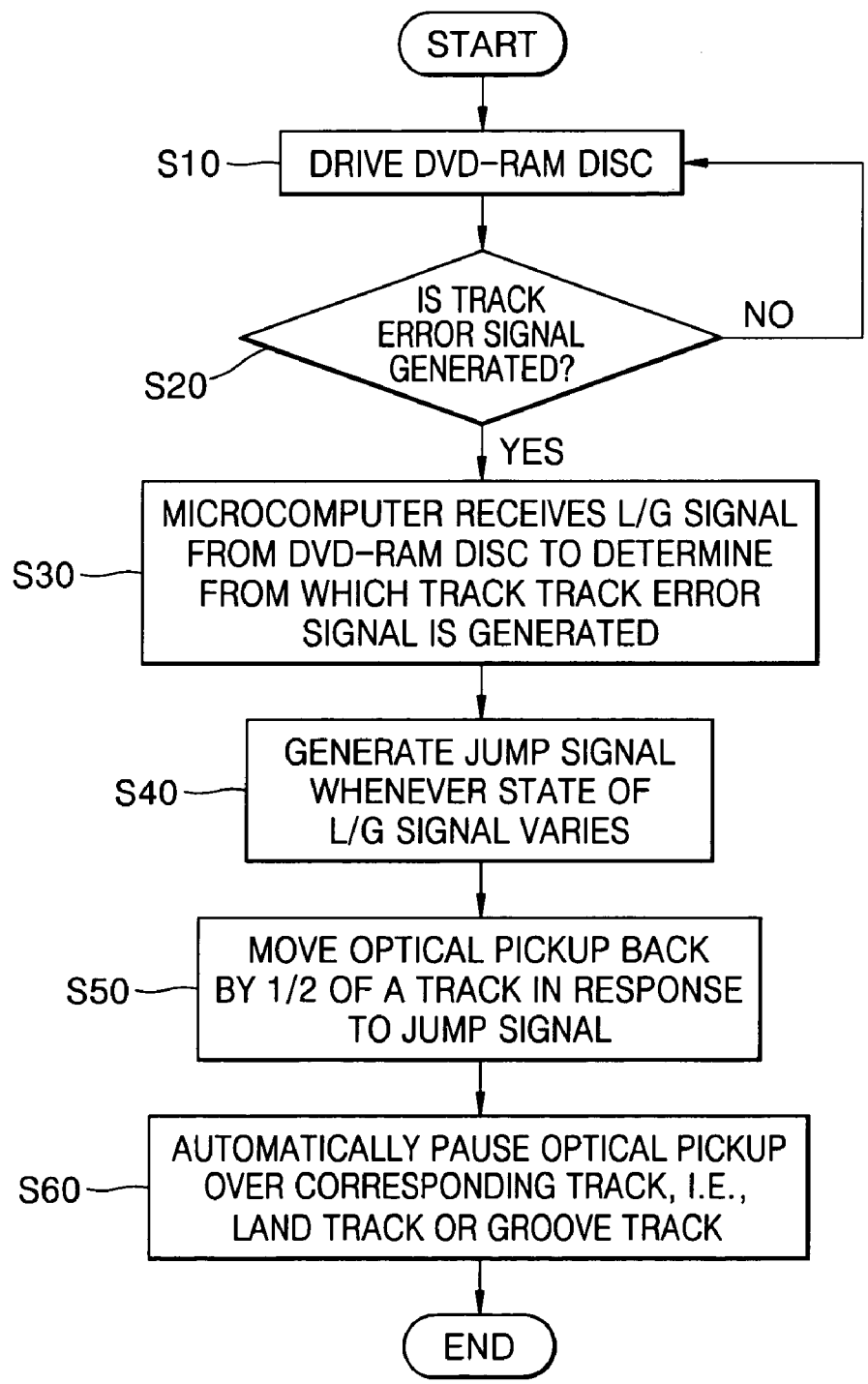
FIG. 2 is a flowchart for explaining a method of automatically pausing an optical pickup in a DVD-RAM disc drive, according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

A method of automatically pausing an optical pickup in a DVD-RAM disc drive will now be described with reference to FIGS. 2 through 5. In S10, the DVD-RAM disc 11 is driven.

Figure 4:
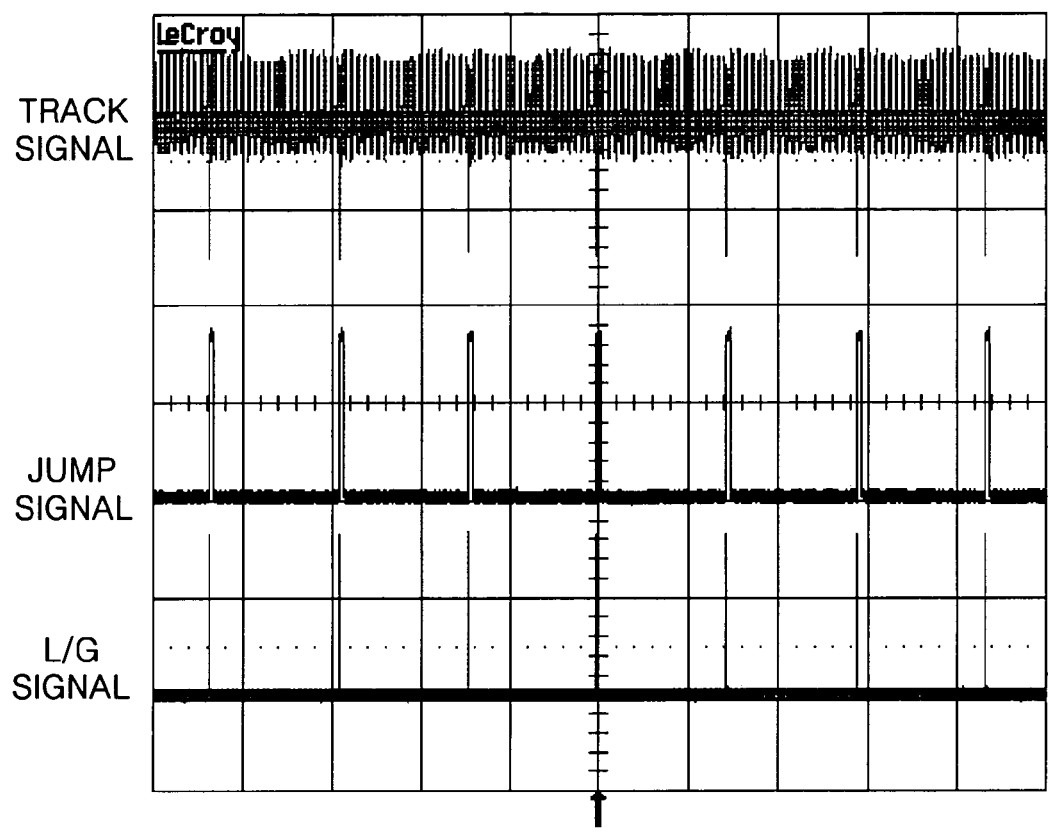
FIG. 4 is a view showing waveforms of a track signal, a jump signal, and an L/G signal when a tracking error signal is detected from the track signal.
Figure 5:
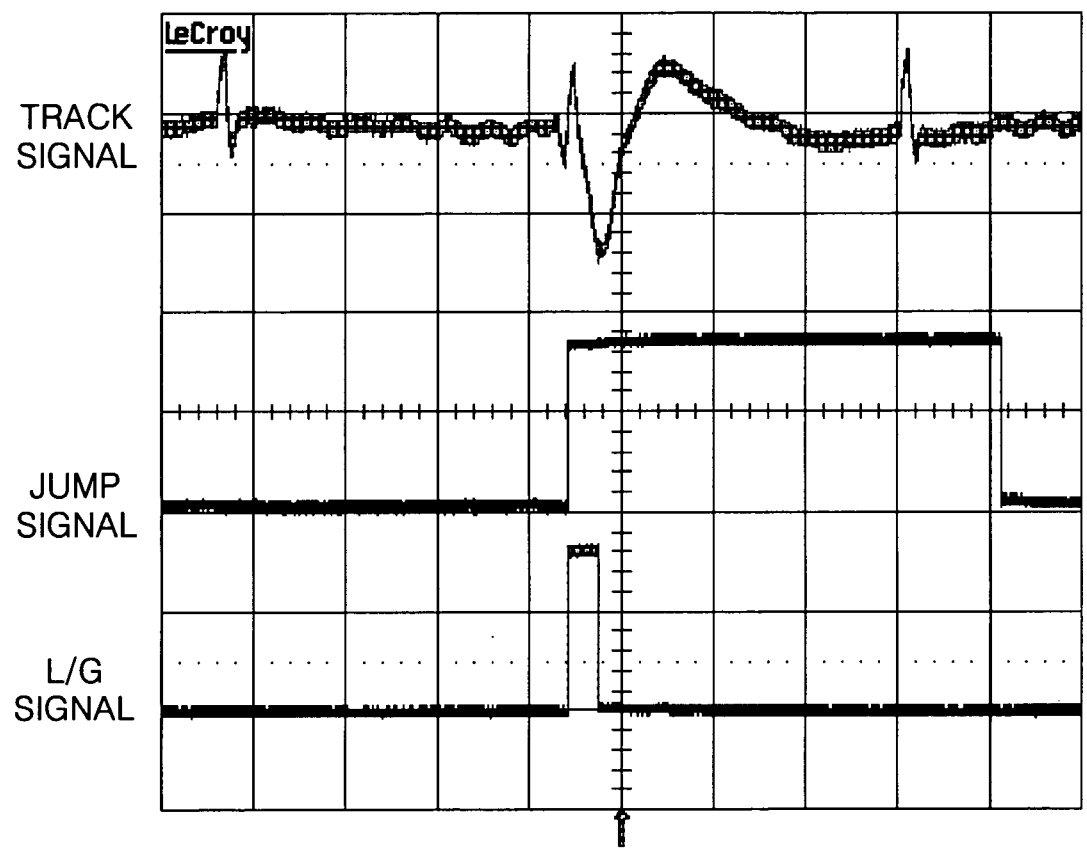
FIG. 5 is a view showing an enlarged portion of the waveforms of FIG. 4.

In S20, a determination is made as to whether a tracking error signal, as shown in FIGS. 4 and 5, is generated. If, in S20, it is determined that the tracking error signal has been generated, in S30 a microcomputer (not shown) of a DVD-RAM disc drive receives an L/G signal from the DVD-RAM disc 11 to determine from which track the tracking error signal is generated. In S40, the microcomputer generates a jump signal whenever a state of the L/G signal varies. In S50, the DVD-RAM disc drive moves the optical pickup back by ½ of a track in response to the jump signal. In S60, the optical pickup automatically pauses over a corresponding track, i.e., a land track or a groove track.

Figure 3:
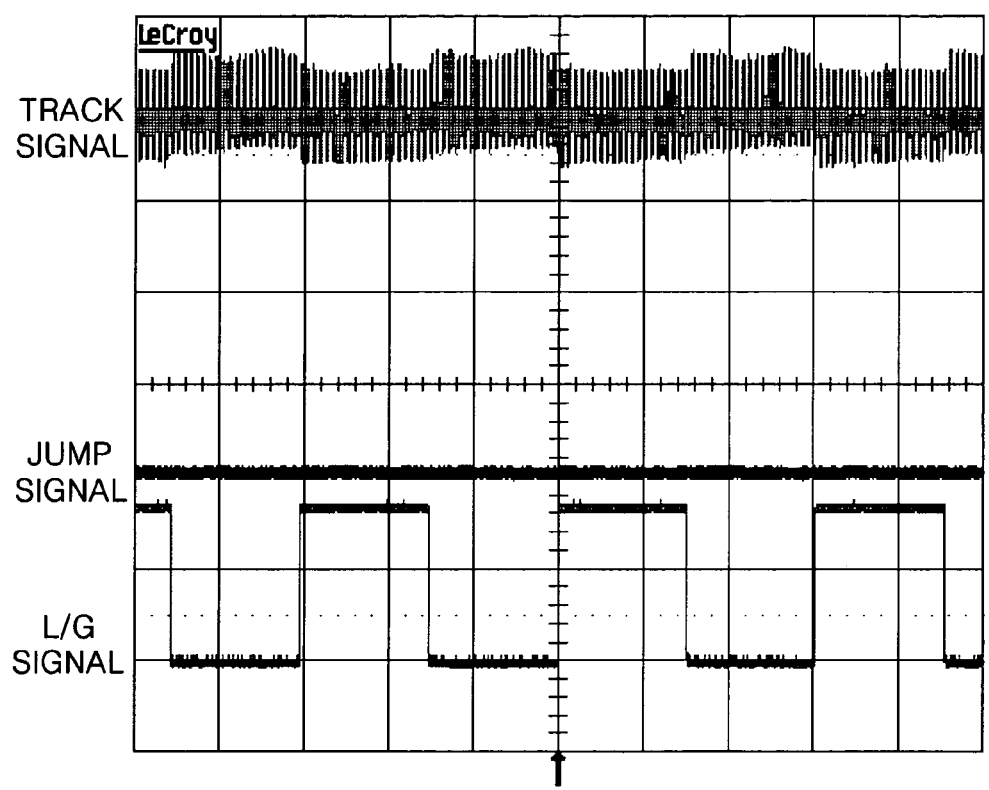
FIG. 3 is a view showing waveforms of a track signal, a jump signal, and an L/G signal when a tracking error signal is not detected from the track signal.

The present invention uses the L/G signal to distinguish the groove tracks 12 and the land tracks 13 which are formed depending on the format characteristic of the DVD-RAM disc 11. A tracking error signal may not be generated when the DVD-RAM disc 11 rotates, as shown in FIG. 3. In this case, the jump signal is not generated, and the L/G signal has a square waveform. In other words, as shown in FIG. 3, when the tracking error signal is not generated, the L/G signal is output at a level corresponding to a track from which the tracking error signal is not generated. In this embodiment of the present invention, the L/G signal is output at a high level when the optical pickup performs reading from the land tracks 13, while the L/G signal is output at a low level when the optical pickup performs reading from the groove tracks 12.

Meanwhile, when the DVD-RAM disc 11 rotates in S10, the tracking error signal as shown in FIGS. 4 and 5 may be generated in S20. In S30, the microcomputer of the DVD-RAM disc drive receives the L/G signal to determine from which track the tracking error signal is generated. In S40, the microcomputer generates the jump signal as shown in FIGS. 4 and 5 whenever the state of the L/G signal varies, i.e., the L/G signal transits from a high level to a low level, or from the low level to the high level.

In S50, the DVD-RAM disc drive moves the optical pickup back by ½ of a track in response to the jump signal. As a result, in S60, the optical pickup automatically pauses over only a corresponding track, i.e., the groove track 12 or the land track 13.

Referring to FIG. 5, when the tracking error signal is generated from a track signal, the jump signal is generated so as to move the optical pickup back by ½ of a track. Thus, the optical pickup remains over the groove track 12, instead of moving from the groove track 12 to the land track 13.

In summary, according to the present invention, a DVD-RAM disc drive moves an optical pickup back by ½ of a track. Thus, the DVD-RAM disc drive can automatically pause the optical pickup over only land tracks or groove tracks.

Figure 6:
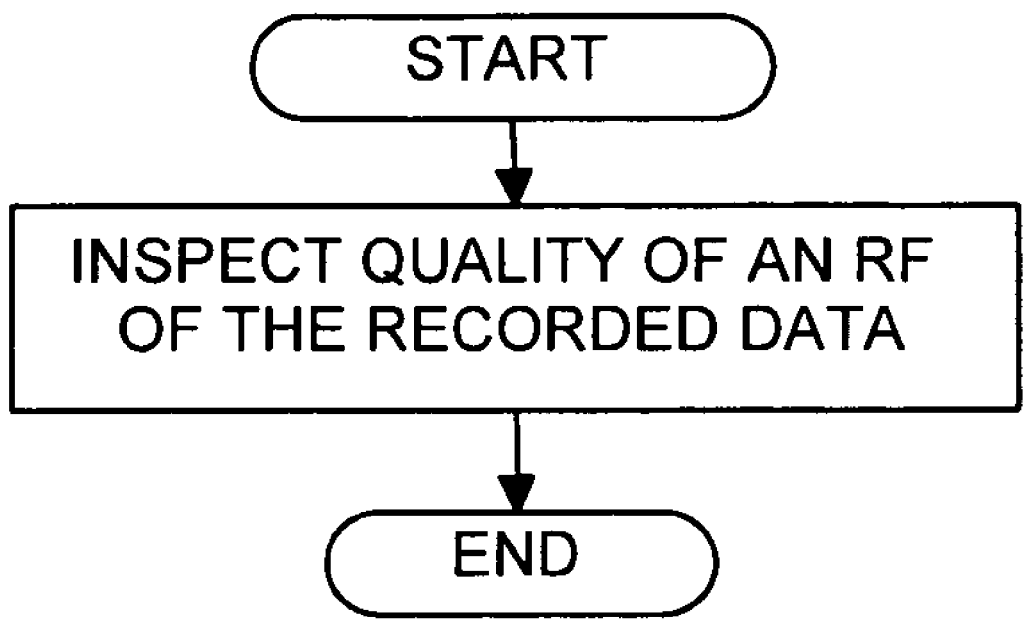
FIG. 6 is a flowchart of a process of inspecting a quality of an RF of recorded data, according to an embodiment of the present invention.

As another aspect of the present invention, when data is recorded only in the land tracks of a DVD-RAM disc, a quality of an RF of the recorded data is inspected only in the land tracks from which, as in the embodiment discussed above, an L/G signal with a high level is output. In contrast, when data is recorded only in the groove tracks of the DVD-RAM disc, a quality of an RF of the recorded data is inspected only in the groove tracks from which, as in the embodiment discussed above, an L/G signal with a low level is output. FIG. 6 is a flowchart of a process of inspecting a quality of an RF of recorded data according to an embodiment of the present invention.

As described above, in a method of automatically pausing an optical pickup in a DVD-RAM disc drive according to the present invention, an L/G signal can be generated to discern land tracks and groove tracks of a DVD-RAM disc on which data is recorded. The DVD-RAM disc drive can automatically pause the optical pickup in response to the L/G signal. As a result, the DVD-RAM disc can be conveniently used.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of automatically pausing an optical pickup in a DVD-RAM disc drive, the method comprising:

determining whether a tracking error signal is generated during driving of a DVD-RAM disc;

generating a land/groove signal to discern land tracks and groove tracks of the DVD-RAM disc, wherein the land/groove signal is at a first state when the optical pickup is positioned over the land tracks, the land/groove signal is at a second state when the optical pickup is positioned over the groove tracks, the land/groove signal transits from the first state to the second state or from the second state to the first state, and the optical pickup is positioned over either the land tracks or the groove tracks depending on the state of the land/groove signal;

determining from which track the tracking error signal has been generated using the generated land/groove signal, in response to the determination that the tracking error signal has been generated;

generating a jump signal in response to a state of the land/groove signal varying;

moving the optical pickup back by ½ of a track in response to the jump signal;

inspecting a quality of an RF of data recorded in the land tracks in response to data being recorded only in the land tracks; and inspecting a quality of an RF of data recorded in the groove tracks in response to data being recorded only in the groove tracks, wherein a microcomputer of the DVD-RAM disc drive receives the land/groove signal and determines from which track the tracking error signal has been generated.

2. The method of claim 1, wherein the first state is a high level, and the second state is a low level.

3. The method of claim 1, wherein the first state is a low level, and the second state is a high level.

4. A method of automatically pausing an optical pickup in a DVD-RAM disc drive, the method comprising:

generating a land/groove signal to discern land tracks and groove tracks of a DVD-RAM disc, wherein the land/groove signal is at a first state when the optical pickup is positioned over the land tracks, the land/groove signal is at a second state when the optical pickup is positioned over the groove tracks, the land/groove signal transits from the first state to the second state or from the second state to the first state, and the optical pickup is positioned over either the land tracks or the groove tracks depending on the state of the land/groove signal; and determining from which track a tracking error signal has been generated using the generated land/groove signal; and generating a jump signal in response to a state of the land/groove signal varying;

moving the optical pickup back by ½ of a track in response to the jump signal;

inspecting a quality of an RF of data recorded in the land tracks in response to data being recorded only in the land tracks; and inspecting a quality of an RF of data recorded in the groove tracks in response to data being recorded only in the groove tracks;

wherein a microcomputer of the DVD-RAM disc drive receives the land/groove signal and determines from which track the tracking error signal has been generated.

5. A method of automatically pausing an optical pickup in a DVD-RAM disc drive, the method comprising:

determining whether a tracking error signal is generated during driving of a DVD-RAM disc;

generating a land/groove signal to discern land tracks and groove tracks of the DVD-RAM disc;

determining from which track the tracking error signal has been generated using the generated land/groove signal, in response to the determination that the tracking error signal has been generated;

generating a jump signal whenever the state of the land/groove signal varies; and automatically pausing the optical pickup by moving the optical pickup back by ½ of a track in response to the jump signal, wherein a microcomputer of the DVD-RAM disc drive receives the land/groove signal and determines from which track the tracking error signal has been generated.

* * * * *